(12) United States Patent
Guo et al.

(10) Patent No.: US 10,129,054 B2
(45) Date of Patent: Nov. 13, 2018

(54) TRAINING SEQUENCES WITH ENHANCED IQ IMBALANCE TOLERANCES FOR TRAINING-AIDED FREQUENCY DOMAIN EQUALIZATION

(71) Applicant: Futurewei Technologies, Inc., Plano, TX (US)

(72) Inventors: Qing Guo, Dublin, CA (US); Wei-Ren Peng, Santa Clara, CA (US); Yan Cui, Sunnyvale, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/429,447

(22) Filed: Feb. 10, 2017

(65) Prior Publication Data

US 2018/0234273 A1    Aug. 16, 2018

(51) Int. Cl.
*H04B 10/00*    (2013.01)
*H04L 25/03*    (2006.01)
*H04B 10/532*    (2013.01)
*H04B 10/61*    (2013.01)

(52) U.S. Cl.
CPC ..... *H04L 25/03159* (2013.01); *H04B 10/532* (2013.01); *H04B 10/6151* (2013.01); *H04L 2025/03522* (2013.01)

(58) Field of Classification Search
CPC . H04J 14/06; H04B 10/0779; H04B 10/6166; H04B 10/5053; H04B 10/616; H04B 10/40
See application file for complete search history.

(56) References Cited

U.S. PATENT DOCUMENTS

| | | | | |
|---|---|---|---|---|
| 8,873,953 B2 * | 10/2014 | Zhang | ............ | H04B 10/532 398/182 |
| 9,698,909 B2 * | 7/2017 | Wang | ............ | H04B 10/27 |
| 2010/0265260 A1 * | 10/2010 | Swic | ............ | G09G 5/399 345/539 |
| 2011/0255870 A1 * | 10/2011 | Grigoryan | ............ | H04B 10/548 398/65 |
| 2012/0084619 A1 * | 4/2012 | Kuschnerov | ............ | H04J 14/06 714/752 |

(Continued)

FOREIGN PATENT DOCUMENTS

| | | |
|---|---|---|
| CN | 102204133 A | 9/2011 |
| CN | 105553891 A | 5/2016 |
| CN | 106100741 A | 11/2016 |

OTHER PUBLICATIONS

Tran et al. "8×40-Gb/s Optical Coherent Pol-M:ux Single Carrier System With :Frequency Domain Equalization and Training Sequences", IEEE, vol. 24, No. 11. Jun. 1, 2012 (provided in the Applicant's IDS, dated Feb. 10, 2017).*

(Continued)

*Primary Examiner* — Berhanu Tadese
(74) *Attorney, Agent, or Firm* — Conley Rose, P.C.

(57) ABSTRACT

Systems and methods for creating and using a first and second group of training sequences in a training-aided single-carrier frequency domain equalization system. The first group of training sequences are conventional training sequences and the second group of training sequences are 90°-rotated versions of the first group of training sequences.

17 Claims, 5 Drawing Sheets

(56) References Cited

U.S. PATENT DOCUMENTS

| | | | |
|---|---|---|---|
| 2012/0148255 A1* | 6/2012 | Liu | H04B 10/50 398/136 |
| 2012/0224862 A1* | 9/2012 | Liu | H04B 10/5161 398/152 |
| 2012/0263467 A1 | 10/2012 | Cvijetic et al. | |
| 2013/0058649 A1 | 3/2013 | Li et al. | |
| 2013/0216239 A1* | 8/2013 | Zhang | H04B 10/613 398/202 |
| 2013/0272704 A1* | 10/2013 | Zamani | H04J 14/06 398/65 |
| 2014/0029957 A1* | 1/2014 | Sethumadhavan | H04B 10/588 398/192 |
| 2014/0147111 A1* | 5/2014 | Kan | H04B 10/613 398/25 |
| 2015/0139649 A1* | 5/2015 | Kikuchi | H04J 14/06 398/65 |
| 2015/0180577 A1* | 6/2015 | Wang | H04B 10/27 398/58 |
| 2015/0236790 A1* | 8/2015 | Guo | H04B 10/5053 398/25 |
| 2015/0288450 A1* | 10/2015 | Zhang | H04B 10/2507 398/115 |
| 2015/0341138 A1 | 11/2015 | Ishihara et al. | |
| 2016/0099777 A1* | 4/2016 | Liu | H04B 10/2513 398/159 |
| 2016/0105236 A1* | 4/2016 | Zhang | H04B 10/25 398/152 |
| 2016/0112238 A1* | 4/2016 | Ling | H04B 10/50 375/261 |
| 2016/0248540 A1* | 8/2016 | Yu | H04J 11/00 |
| 2016/0329967 A1* | 11/2016 | Yu | G02F 1/2255 |
| 2016/0352402 A1* | 12/2016 | Park | H04B 7/10 |
| 2016/0373208 A1* | 12/2016 | Liu | H04B 10/25 |
| 2017/0134096 A1* | 5/2017 | Zheng | H04B 10/5051 |
| 2017/0149502 A1* | 5/2017 | Krishnan | H04B 10/2513 |
| 2017/0155448 A1* | 6/2017 | Krishnan | H04L 25/0224 |
| 2017/0180055 A1* | 6/2017 | Yu | H04B 10/612 |
| 2017/0214485 A1* | 7/2017 | Yu | H04J 14/0298 |
| 2017/0288760 A1* | 10/2017 | Qiao | H04B 7/0665 |

OTHER PUBLICATIONS

Falconer, D., et al., "Frequency Domain Equalization for Single-Carrier Broadband Wireless Systems," Wideband Wireless Access Technologies to Broadband Internet, IEEE Communications Magazine, Apr. 2002, pp. 58-66.

Liu, H.,"Frequency—Domain Equalization of Single Carrier Transmissions Over Doubly Selective Channels," Dissertation, Presented in Partial Fulfillment of the Requirements for the Degree Doctor of Philosphy in the Graduate School of the Ohio State University, 2007, 152 pages.

Pancaldi, P., et al., "Single-Carrier Frequency Domain Equalization," A focus on wireless applications, IEEE Signal Processing Magazine, Sep. 2008, 22 pages.

Savory, S.J., "Digital Coherent Optical Receivers: Algorithms and Subsystems," IEEE Journal of Selected Topics in Quantum Electronics, vol. 16, No. 5, Sep./Oct. 2010, pp. 1164-1179.

Tran, A.V., et al., "Computational-Efficient and Modulation Format-Flexible Training-Aided Single Carrier Digital Coherent Receiver," Invited paper, International Conference on Optical Internet (COIN), 2013, 5 pages.

Tran, A.V., et al, "8×40-Gb/s Optical Coherent Pol-Mux Single Carrier System With Frequency Domain Equalization and Training Sequences, "IEEE Photonics Technology Letters, vol. 24, No. 11, Jun. 1, 2012, IEEE, pp. 885-887.

Pittala, F., et al., Training-Aided Frequency-Domain Channel Estimation and Equalization for Singe-Carrier Coherent Optical Transmission Systems, Journal of Lightwave Technology, vol. 32, No. 24, Dec. 15, 2014, IEEE, pp. 4849-4863.

Machine Translation and Abstract of Chinese Publication No. CN105553891, May 4, 2016, 6 pages.

Machine Translation and Abstract of Chinese Publication No. CN106100741, Nov. 9, 2016, 15 pages.

Foreign Communication From a Counterpart Application, PCT Application No. PCT/CN2018/074970, English Translation of International Search Report dated Mar. 28, 2018, 5 pages.

Foreign Communication From a Counterpart Application, PCT Application No. PCT/CN2018/074970, English Translation of Written Opinion dated Apr. 24, 2018, 4 pages.

\* cited by examiner

TRAINING SEQUENCES WITH ENHANCED IQ IMBALANCE TOLERANCES FOR TRAINING-AIDED FREQUENCY DOMAIN EQUALIZATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical transmission of high speed data has led to the rapid expansion of the Internet. Modulation techniques such as quadrature phase shift keying (QPSK) and multilevel quadrature amplitude modulation (nQAM) have transformed communication from simple kilobaud-speed transmission of data one bit at a time to simultaneous transmission of multiple stream/multiple bit symbol data at terabit-speeds.

In a typical conventional optical data transmission system, a digital signal processor (DSP) converts the original digital data into high-speed signals. An optical modulator uses these high-speed signals to create a modulated analog light signal that carries the data over the optical fiber network. On the other end of the fiber network, an optical receiver detects the modulated analog light signal and a DSP extracts the digital information carried on the analog light signal.

Figure 1:
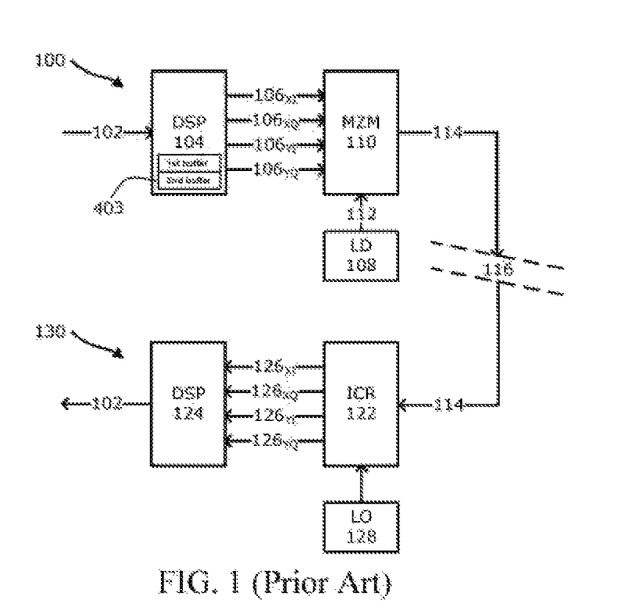
FIG. 1 is a conventional optical transmitter and receiver configuration.

FIG. 1 shows an example of a typical conventional polarization-multiplexed (PM) nQAM optical transmission system where transmitter 100 converts digital data 102 to modulated optical signal 114 which is received by receiver 130 and converted back to digital data 102. DSP 104 creates high-speed data signals $106_{XI}$, $106_{XQ}$, $106_{YI}$, and $106_{YQ}$ from digital data 102; data signals $106_{XI}$, $106_{XQ}$, $106_{YI}$, and $106_{YQ}$ represent the in-phase (I) and quadrature (Q) components for the X-polarization and Y-polarization signals. Data signals $106_{XI}$, $106_{XQ}$, $106_{YI}$, and $106_{YQ}$ are sent (via radio frequency (RF) drivers, not shown) to Mach Zehnder modulator (MZM) 110 which imposes the data signals onto coherent carrier wave 112 emitted by laser diode 108 to produce modulated optical signal 114. Optical signal 114 travels from transmitter 100 through optical network 116 to receiver 130, where integrated coherent receiver (ICR) 122 which extracts data signals $126_{XI}$, $126_{XQ}$, $126_{YI}$, and $126_{YQ}$ using local oscillator (LO) 128; data signals $126_{XI}$, $126_{XQ}$, $126_{YI}$, and $126_{YQ}$ are a mix of data signals $106_{XI}$, $106_{XQ}$, $106_{YI}$, and $106_{YQ}$. ICR 122 sends data signals $126_{XI}$, $126_{XQ}$, $126_{YI}$, and $126_{YQ}$ to DSP 124 (via analog-to-digital converters, not shown), which applies an inverse of an estimated transfer function to reproduce digital data 102.

The modulated optical signal 114 of the conventional system shown in FIG. 1 contains densely packed information. With the increased density of information comes a technical challenge of designing equipment that can efficiently and accurately transmit and extract the original data. While manufacturing techniques have vastly improved the quality of optical equipment, even slight imperfections in the optical and electrical components can distort data signals $106_n$ and $126_n$ as well as optical signal 114. The result is that version of digital data 102 that exits receiver 130 may differ from the version of digital data 102 that initially entered transmitter 100.

One way to correct for transmission impairments is to tighten the specifications of the optical and electrical components, however cost and availability make this approach impractical. A more practical alternative is to modify the transfer function used by the DSP so that it knows not only how to extract the original data from the sampled data set, but also how to correct for distortions made to the optical signal during modulation, transmission, and demodulation. While some distortions can be predicted in advance, most distortions are a function of the specific network configuration—the modulation and demodulation equipment, the fiber length and shape, the number and quality of connections, and the data content itself. By programming the transmitter's DSP to insert known data patterns, or "training sequences," into the data stream, the receiver's DSP can learn how a given network configuration distorts the optical signal, based on the difference between the training sequences and the training sequences as received. With this knowledge, the receiver's DSP can customize its transfer functions to correct for the transmission impairments that have distorted the optical signal.

Ideally, the training sequences should be short in length but sufficiently complex so that the receiving DSP can quickly and efficiently develop a suitable transfer function that corrects for transmission distortions. To that end, network designers have developed known training sequences including constant-amplitude zero-autocorrelation (CAZAC) and Golay sequences. The paper Computational-Efficient and Modulation Format-Flexible Training-Aided Single-Carrier Digital Coherent Receiver (Tran et al., 2013), for example, describes the use of CAZAC and Golay training sequences, and is incorporated by reference.

Figure 2:
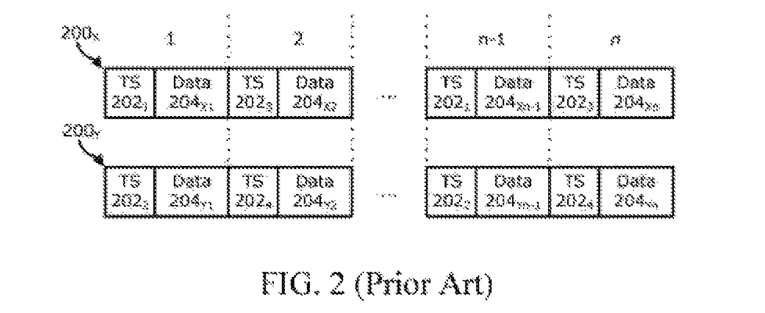
FIG. 2 is a data stream including conventional training sequences.

FIG. 2 shows frames 1 through n of a dual polarization data stream that might be used with a PM-QAM transmission system as shown in FIG. 1. In this example, X-polarization data stream $200_x$ includes data segments $204_{X1}$ through $204_{Xn}$, and Y-polarization data stream $200_y$ includes data segments $204_{Y1}$ through $204_{Yn}$. Training sequences (TS) $202_1$ and $202_3$ are repeated in the X-polarization data stream and training sequences $202_2$ and $202_4$ are repeated in the Y-polarization data stream. TS $202_1$ is orthogonal to TS $202_2$ in the time domain, and TS $202_3$ is orthogonal to TS $202_4$ in the time domain. The data streams may also contain cyclic prefixes (not shown) to help eliminate interference between adjacent training sequences and data.

For training-aided frequency domain equalization (TA-FDE), the dual polarization data stream can be estimated using a transfer function $T(f)$ which is based on the received training sequences ($RTS_n$) and the transmitted training sequences ($TTS_n$) for two consecutive frames:

$$T(f) = \begin{bmatrix} RTS_1(f) & RTS_3(f) \\ RTS_2(f) & RTS_4(f) \end{bmatrix} \begin{bmatrix} TTS_1(f) & TTS_3(f) \\ TTS_2(f) & TTS_4(f) \end{bmatrix}^{-1} \quad \text{(eq. 1)}$$

By repeating the calculation over the course of several frames, the transfer function can be further and further refined. For example, a newly calculated transfer function can be calculated from the previously calculated transfer function and the transfer function calculated from the current frame n as follows:

$$T_{NEW}(f)=\alpha T_{PREV}(f)+(1-\alpha)T_n(f) \quad (eq. 2)$$

where $T_{NEW}(f)$ is the new transfer function as calculated over n frames, $T_{PREV}(f)$ is the transfer function as calculated over n−1 frames, $T_n(f)$ is the transfer function calculated from the current frame n, and $\alpha$ is a forgetting factor with a typical value of 0.8~0.9.

Techniques such as orthogonal frequency division multiplexing (OFDM), single carrier system with time domain equalization (SC-TDE), and single carrier system with frequency domain equalization (SC-FDE) have been used for data transmission. However, both OFDM and SC-TDE systems have disadvantages compared to SC-FDE systems. For example, OFDM systems experience sensitivity to nonlinear impairments, phase noise, and frequency offset. Likewise, SC-TDE systems require analysis of many signal samples, referred to as "taps," which complicates the processing requirements for extracting data from the data stream. In contrast, SC-FDE provides performance comparable to OFDM and SC-TDE without their respective disadvantages.

Figure 3:
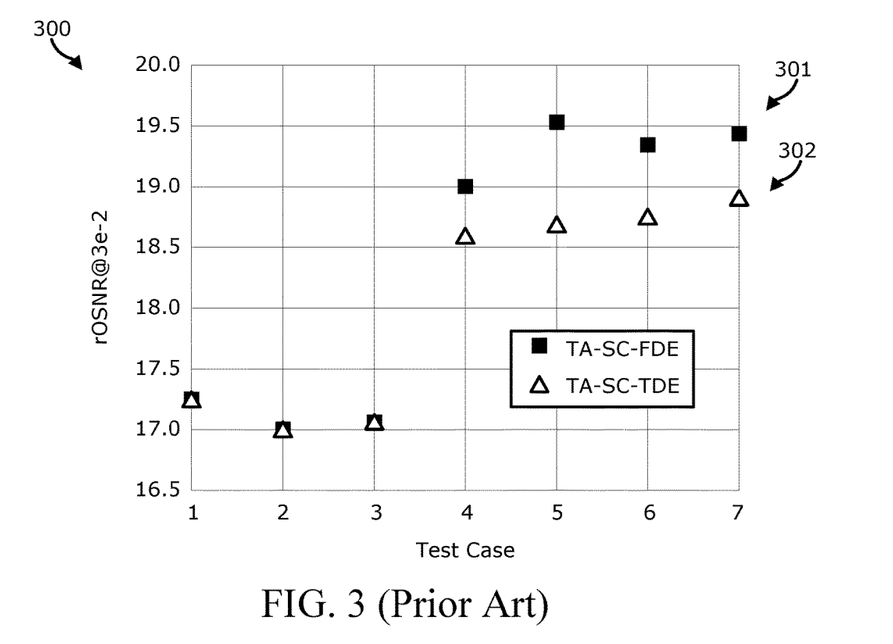
FIG. 3 is a chart comparing performance of conventional training-aided single carrier frequency domain equalizer (TA-SC-FDE) systems with conventional training-aided single carrier time domain equalizer (TA-SC-TDE) systems.

Although the conventional training sequences used perform comparably to SC-TDE when used with SC-FDE under ideal conditions, the performance drops sharply in real-world conditions, resulting in lower overall throughput. By way of example, chart 300 in FIG. 3 compares the required optical signal to noise ratio (rOSNR) for seven test simulations for a 34.4 GHz 16 QAM optical modulated signal using CAZAC training sequences with SC-TDE (13 taps) and a comparable signal using conventional training sequence aided SC-FDE. In the first three test cases, the transceivers are ideal (that is, there are no distortions caused by the transceiver components), while in the next four test cases, the transceivers use worst-case specifications of available optical and electrical transceiver components. As can be seen, for ideal transceivers (test cases 1-3) the performance of the SC-FDE configuration (shown as squares 301) is the same as the SC-TDE configuration (shown as triangles 302). However, where the transceivers are not ideal, the performance of the SC-FDE configuration is markedly inferior to that of the SC-TDE configuration. Thus a SC-FDE system can only achieve the same data throughput as SC-TDE over shorter transmission distances.

What is needed, therefore, are training sequences that can be used with SC-FDE and will lead to comparable or superior overall performance in comparison with SC-TDE.

SUMMARY

In a first embodiment, a digital signal processor (DSP) creates a data stream for transmission over fiber optic media by receiving a plurality of data segments, writing a first frame to a first buffer, wherein the first frame comprises a first training sequence and a first data segment of the plurality of data segments, writing a second frame to the first buffer, wherein the second frame comprises a second training sequence and a second data segment of the plurality of data segments, writing a third frame to the first buffer, wherein the third frame comprises a third training sequence and a third data segment of the plurality of data segments, and writing a fourth frame to the first buffer, wherein the fourth frame comprises a fourth training sequence and a fourth data segment of the plurality of data segments, wherein the first training sequence and the second training sequences are mathematically related to the third training sequence and the fourth training sequence.

In a variation, the third training sequence is derived from the first training sequence by rotating the first training sequence by ninety degrees and the fourth training sequence is derived from the second training sequence by rotating the second training sequence by ninety degrees.

In another variation, the third training sequence and the fourth training sequence are derived from the first training sequence and the second training sequence according to the relationships $$S_3(f) = S_1(f) \times e^{j\frac{\pi}{2}} = jS_1(f)$$

and $$S_4(f) = S_2(f) \times e^{j\frac{\pi}{2}} = jS_2(f),$$

wherein $S_1(f)$ is the Fourier transform of the first training sequence, wherein $S_2(f)$ is the Fourier transform of the second training sequence, wherein $S_3(f)$ is the Fourier transform of the third training sequence, wherein $S_4(f)$ is the Fourier transform of the fourth training sequence, wherein e is Euler's number, and wherein j is the square root of −1.

In another variation, the method further comprises writing a first frame to a second buffer, wherein the first frame comprises a fifth training sequence and a fifth data segment of the plurality of data segments, writing a second frame to the second buffer, wherein the second frame comprises a sixth training sequence and a sixth data segment of the plurality of data segments, writing a third frame to the second buffer, wherein the third frame comprises a seventh training sequence and a seventh data segment of the plurality of data segments and writing a fourth frame to the second buffer, wherein the fourth frame comprises an eighth training sequence and an eighth data segment of the plurality of data segments, wherein the seventh training sequence and the eighth training sequence are mathematically related to the fifth training sequence and the sixth training sequence.

In another variation, the seventh training sequence is derived from the fifth training sequence by rotating the fifth training sequence by ninety degrees and the eighth training sequence is derived from the sixth training sequence by rotating the sixth training sequence by ninety degrees.

In another variation, the seventh training sequence and the eighth training sequence are derived from the fifth training sequence and the sixth training sequence according to the relationships $$S_7(f) = S_5(f) \times e^{j\frac{\pi}{2}} = jS_5(f)$$

and $$S_8(f) = S_6(f) \times e^{j\frac{\pi}{2}} = jS_6(f),$$

wherein $S_5(f)$ is the Fourier transform of the fifth training sequence, wherein $S_6(f)$ is the Fourier transform of the sixth training sequence, wherein $S_7(f)$ is the Fourier transform of the seventh training sequence, wherein $S_8(f)$ is the Fourier transform of the eighth training sequence, wherein e is Euler's number, and wherein j is the square root of −1.

In another variation, the data stream comprises an X-polarization data stream portion and a Y-polarization data stream portion, wherein the first buffer corresponds to an X-polarization data stream portion, and wherein the second buffer corresponds to a Y-polarization data stream portion.

In another variation, the method further comprises precoding the first buffer into an in-phase high-speed data signal and a quadrature high-speed data signal and sending the in-phase high-speed data signal and a quadrature high-speed data signal to a modulator.

In another variation, the method further comprises precoding the X-polarization data stream portion into a first in-phase high-speed data signal and a first quadrature high-speed data signal, precoding the Y-polarization data stream portion into a second first in-phase high-speed data signal and a second quadrature high-speed data signal, and sending the first in-phase high-speed data signal, the first a quadrature high-speed data signal, the second in-phase high-speed data signal, and the second quadrature high-speed data signal to a dual-polarization modulator.

In a second embodiment, a receiver interprets a dual-polarization optical signal by receiving the optical signal, the optical signal comprises four frames of an X-polarization data stream and four frames of a Y-polarization data stream, each frame comprises a unique training sequence, the training sequence of the first frame of the X-polarization data stream is mathematically-related to the training sequence of the third frame of the X-polarization data stream, the training sequence of the second frame of the X-polarization data stream is mathematically-related to the training sequence of the fourth frame of the X-polarization data stream, the training sequence of the first frame of the Y-polarization data stream is mathematically-related to the training sequence of the third frame of the Y-polarization data stream, and the training sequence of the second frame of the Y-polarization data stream is mathematically-related to the training sequence of the fourth frame of the Y-polarization data stream, estimating the first and second frames of the X-polarization data stream and the first and second frames of the Y-polarization data stream according to a first transfer function, calculating a second transfer function according to the first transfer function, the training sequence of the first and second frames of the X-polarization data stream, and the training sequences of the first and second frames of the Y-polarization data stream, estimating the third and fourth frames of the X-polarization data stream and the third and fourth frames of the Y-polarization data stream according to the second transfer function, and calculating a third transfer function according to the second transfer function, the training sequence of the third and fourth frames of the X-polarization data stream, and the training sequences of the third and fourth frames of the Y-polarization data stream.

In a variation, the training sequence of the third frame of the X-polarization data stream is rotated by ninety degrees with respect to the training sequence of the first frame of the X-polarization data stream, the training sequence of the fourth frame of the X-polarization data stream is rotated by ninety degrees with respect to the training sequence of the second frame of the X-polarization data stream, the training sequence of the third frame of the Y-polarization data stream is rotated by ninety degrees with respect to the training sequence of the first frame of the Y-polarization data stream, and the training sequence of the fourth frame of the Y-polarization data stream is rotated by ninety degrees with respect to the training sequence of the second frame of the Y-polarization data stream.

In a variation, the mathematical relationship between the training sequences is $$X_3(f) = X_1(f) \times e^{j\frac{\pi}{2}} = jX_1(f),$$
$$X_4(f) = X_2(f) \times e^{j\frac{\pi}{2}} = jX_2(f), Y_3(f) = Y_1(f) \times e^{j\frac{\pi}{2}} = jY_1(f),$$

and $$Y_4(f) = Y_2(f) \times e^{j\frac{\pi}{2}} = jY_2(f),$$

wherein $X_n(f)$ is the training sequence of the $n^{th}$ frame of the X-polarization data stream, wherein $Y_n(f)$ is the training sequence of the $n^{th}$ frame of the Y-polarization data stream, wherein e is Euler's number, and wherein j is the square root of −1.

In another variation, the second transfer function is calculated according to the relationship $$T_2(f) = \alpha T_1(f) + (1-\alpha)\begin{bmatrix} RX_1(f) & RX_2(f) \\ RY_1(f) & RY_2(f) \end{bmatrix}\begin{bmatrix} TX_1(f) & TX_2(f) \\ TY_1(f) & TY_2(f) \end{bmatrix}^{-1},$$

wherein $T_2(f)$ is the second transfer function, $T_1(f)$ is the first transfer function, wherein $RX_1(f)$ and $RX_2(f)$ are the received training sequences from the first and second frames of the X-polarization data stream, wherein $RY_1(f)$ and $RY_2(f)$ are the received training sequences from the first and second frames of the Y-polarization data stream, wherein $TX_1(f)$ and $TX_2(f)$ are the transmitted training sequences from the first and second frames of the X-polarization data stream, wherein $TY_1(f)$ and $TY_2(f)$ are the transmitted training sequences from the first and second frames of the Y-polarization data stream, and wherein α is a forgetting factor between 0.8 and 0.9.

In another variation, the third transfer function is calculated according to the relationship $$T_3(f) = \alpha T_2(f) + (1-\alpha)\begin{bmatrix} RX_3(f) & RX_4(f) \\ RY_3(f) & RY_4(f) \end{bmatrix}\begin{bmatrix} TX_3(f) & TX_4(f) \\ TY_3(f) & TY_4(f) \end{bmatrix}^{-1},$$

wherein $T_3(f)$ is the third transfer function, $T_2(f)$ is the second transfer function, wherein $RX_3(f)$ and $RX_4(f)$ are the received training sequences from the third and fourth frames of the X-polarization data stream, wherein $RY_3(f)$ and $RY_4(f)$ are the received training sequences from the third and fourth frames of the Y-polarization data stream, wherein $TX_3(f)$ and $TX_4(f)$ are the transmitted training sequences from the third and fourth frames of the X-polarization data stream, wherein $TY_3(f)$ and $TY_4(f)$ are the transmitted training sequences from the third and fourth frames of the Y-polarization data stream, and wherein α is a forgetting factor between 0.8 and 0.9.

In another variation, estimating the first and second frames of the X-polarization data stream and the first and second frames of the Y-polarization data stream comprises transforming the optical signal from an analog representation to a first time-domain digital representation, transforming the time-domain digital representation to a first frequency-domain digital representation, creating a second frequency-domain digital representation from the first frequency-domain digital representation according to the first transfer function, transforming the second frequency-domain digital representation to a second time-domain digital representation, and decoding the second time-domain digital representation according to a modulation scheme.

In another variation, creating a second frequency-domain digital representation comprises applying the first transfer function to the first frequency-domain digital representation according to the relationship $$\begin{bmatrix} X_2(f) \\ Y_2(f) \end{bmatrix} = \begin{bmatrix} T_{XX}(f) & T_{XY}(f) \\ T_{YX}(f) & T_{YY}(f) \end{bmatrix}^{-1} \begin{bmatrix} X_1(f) \\ Y_1(f) \end{bmatrix},$$

wherein $X_2(f)$ and $Y_2(f)$ are an X-polarization component and a Y-polarization component of the second frequency-domain digital representation, wherein $X_1(f)$ and $Y_1(f)$ are an X-polarization component and a Y-polarization component of the first frequency-domain digital representation, and the matrix comprising $Txx(f)$, $Txy(f)$, $Tyx(f)$, and $Tyy(f)$ is the first transfer function expressed as a 2×2 matrix.

In a third embodiment, a transceiver for sending and receiving data streams over fiber optic media comprises a transmitter comprising a first digital signal processor (DSP) and a dual-polarity optical modulator and a receiver comprising a second DSP and an integrated coherent receiver (ICR), wherein the first DSP is configured to insert a plurality of training sequences into a first X-polarization data stream, wherein a first training sequence of the first X-polarization data stream is mathematically-related to a second training sequence of the first X-polarization data stream, insert a plurality of training sequences into a first Y-polarization data stream, wherein a first training sequence of the first Y-polarization data stream is mathematically-related to a second training sequence of the first Y-polarization data stream, precode the first X-polarization data stream and the first Y-polarization data stream into a first plurality of high-speed data signals for modulation by the dual-polarity optical modulator, and wherein the second DSP is configured to receive a dual-polarity optical signal from the ICR, wherein the signal comprise four frames of a second X-polarization data stream and four frames of a second Y-polarization data stream, wherein each frame comprises a unique training sequence, wherein a first training sequence of the second X-polarization data stream is mathematically-related to a second training sequence of the second X-polarization data stream, and wherein a first training sequence of the second Y-polarization data stream is mathematically-related to a second training sequence of the second Y-polarization data stream, estimate the first and second frames of the X-polarization data stream and the first and second frames of the Y-polarization data stream according to a first transfer function, and calculate a second transfer function according to the first transfer function, the training sequences of the first and second frames of the X-polarization data stream, and the training sequences of the first and second frames of the Y-polarization data stream.

In a variation, the first training sequence of the first X-polarization data stream is mathematically-related to the second training sequence of the first X-polarization data stream according to the relationship $$X_2(f) = X_1(f) \times e^{j\frac{\pi}{2}} = jX_1(f),$$

and the first training sequence of the first Y-polarization data stream is mathematically-related to the second training sequence of the first Y-polarization data stream according to the relationship $$Y_2(f) = Y_1(f) \times e^{j\frac{\pi}{2}} = jY_1(f).$$

In another variation, a third training sequence of the first X-polarization data stream is mathematically-related to a fourth training sequence of the first X-polarization data stream, a third training sequence of the first Y-polarization data stream is mathematically-related to a fourth training sequence of the first Y-polarization data stream, a third training sequence of the second X-polarization data stream is mathematically-related to a fourth training sequence of the second X-polarization data stream, and a third training sequence of the second Y-polarization data stream is mathematically-related to a fourth training sequence of the second Y-polarization data stream.

In another variation, the first DSP and the second DSP are physically a single DSP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As with conventional systems, optical data transmission systems implementing embodiments of the present disclosure consist of transmitters, optical transmission media, and receivers. Unlike conventional systems, embodiments of the present disclosure require construction of data streams that contain additional derived training sequences (by the transmitter) and interpretation of data streams that contain the derived training sequences (by the receiver).

In order to understand the benefits of using the derived training sequences described in the embodiments of this disclosure, it is necessary to understand the potential for error in using a single training sequence in conventional systems. For simplification, this explanation uses a single-polarization signal (the comparison for a dual-polarization signal would show a similar result, but would be mathematically more complicated). Also for simplification, this explanation ignores any IQ time skew and/or IQ power imbalances in the receiver.

First, let $X(j\omega)$ be the fast Fourier transform (FFT) of the complex training sequence, let $H_I(j\omega)$ and $H_Q(j\omega)$ be the frequency responses of I and Q paths respectively, and let $T(j\omega)$ be the transfer function. If there is no IQ time skew and/or IQ power imbalances in the transmitter, $H_I(j\omega)=H_Q(j\omega)$. The FFT of the received training sequence is:

$$X_R(j\omega) = \frac{1}{2}X(j\omega) \quad (eq.\ 3)$$
$$\left\{[H_I(j\omega)+H_Q(j\omega)] + \frac{X^*(-j\omega)}{X(j\omega)}[H_I(j\omega)-H_Q(j\omega)]\right\}T(j\omega)$$

The estimated transfer function $T_{est}(j\omega)$ in the frequency domain is:

$$T_{est}(j\omega) = \frac{X_R(j\omega)}{X(j\omega)} = \quad (eq.\ 4)$$
$$\frac{1}{2}\left\{[H_I(j\omega)+H_Q(j\omega)] + \frac{X^*(-j\omega)}{X(j\omega)}[H_I(j\omega)-H_Q(j\omega)]\right\}T(j\omega)$$

As can be seen, if there are any transmitter imperfections, including IQ time skew and IQ power imbalance, then $H_I(j\omega)-H_Q(j\omega)$ will not be 0, resulting in estimation error of $T(j\omega)$.

In contrast, consider the estimated transfer functions when using the training sequences of embodiments of the present invention. Let $X(j\omega)$ be the FFT of the first received TS and let $jX(j\omega)$ be the FFT of the second received TS. The FFTs of the two TSs are:

$$X_R^{Rot}(j\omega) = \frac{j}{2}X(j\omega) \quad (eq.\ 5)$$
$$\left\{[H_I(j\omega)+H_Q(j\omega)] - \frac{X^*(-j\omega)}{X(j\omega)}[H_I(j\omega)-H_Q(j\omega)]\right\}T(j\omega)$$

$$X_R(j\omega) = \frac{1}{2}X(j\omega) \quad (eq.\ 6)$$
$$\left\{[H_I(j\omega)+H_Q(j\omega)] + \frac{X^*(-j\omega)}{X(j\omega)}[H_I(j\omega)-H_Q(j\omega)]\right\}T(j\omega)$$

Then the corresponding transfer functions are:

$$T_{Est}^{Rot}(j\omega) = \frac{X_R^{Rot}(j\omega)}{X(j\omega)} = \quad (eq.\ 7)$$
$$\frac{1}{2}\left\{[H_I(j\omega)+H_Q(j\omega)] - \frac{X^*(-j\omega)}{X(j\omega)}[H_I(j\omega)-H_Q(j\omega)]\right\}T(j\omega)$$

$$T_{Est}(j\omega) = \frac{X_R(j\omega)}{X(j\omega)} = \quad (eq.\ 8)$$
$$\frac{1}{2}\left\{[H_I(j\omega)+H_Q(j\omega)] + \frac{X^*(-j\omega)}{X(j\omega)}[H_I(j\omega)-H_Q(j\omega)]\right\}T(j\omega)$$

Assuming that the transfer function $T(j\omega)$ does not change during estimation, taking average of these two transfer functions, the $X^*(-j\omega)$ terms are canceled:

$$T_{AVE}(j\omega) = \frac{T_{Est}^{Rot}(j\omega) + T_{Est}(j\omega)}{2} = \frac{H_I(j\omega)+H_Q(j\omega)}{2}T(j\omega) \quad (eq.\ 9)$$

Therefore, channel estimation accuracy is maintained in the presence of imperfection in transmitter I and Q components, such as IQ time skew, IQ power imbalance, and differences of frequency response in the I and Q components.

In contrast, with only one training sequence, the $X^*(-j\omega)$ terms cannot be not cancelled with averaging:

$$T_{AVE}(j\omega) = \quad (eq.\ 10)$$
$$\frac{H_I(j\omega)+H_Q(j\omega)}{2}T(j\omega) \mp \frac{X^*(-j\omega)}{X(j\omega)}\frac{H_I(j\omega)-H_Q(j\omega)}{2}T(j\omega)$$

Next, consider the scenario where there are IQ imbalances in both the transmitter and receiver. Let $R_I(j\omega)$ and $R_Q(j\omega)$ be the frequency responses of I and Q components of the receiver. Ideally, $R_I(j\omega)=R_Q(j\omega)=1$. With only one training sequence, as in conventional systems, the estimated transfer function without 90° rotation in IQ space is:

$$T_{AVE}(j\omega) = \frac{1}{4}[H_I(j\omega)+H_Q(j\omega)][R_I(j\omega)+R_Q(j\omega)]T(j\omega) + \quad (eq.\ 11)$$
$$\frac{1}{4}\frac{X^*(-j\omega)}{X(j\omega)}[H_I(j\omega)-H_Q(j\omega)][R_I(j\omega)+R_Q(j\omega)]T(j\omega) +$$
$$\frac{1}{4}\frac{X^*(-j\omega)}{X(j\omega)}[H_I^*(-j\omega)-H_Q^*(-j\omega)][R_I(j\omega)-R_Q(j\omega)]T(j\omega) +$$
$$\frac{1}{4}[H_I^*(-j\omega)-H_Q^*(-j\omega)][R_I(j\omega)-R_Q(j\omega)]T(j\omega)$$

where the second and third lines are first-order terms (one from the transmitter and the other from the receiver) and the fourth line is a second-order term which will be much smaller than the first-order terms and exist only when both the transmitter and receiver have IQ imbalances.

Now consider the same scenario but with using the two training sequences. The estimated transfer function is:

$$T_{AVE}(j\omega) = \frac{1}{4}[H_I(j\omega)+H_Q(j\omega)][R_I(j\omega)+R_Q(j\omega)]T(j\omega) + \quad (eq.\ 12)$$
$$\frac{1}{2}[H_I^*(-j\omega)-H_Q^*(-j\omega)][R_I(j\omega)-R_Q(j\omega)]T(j\omega)$$

In contrast to the single training sequence example, there are no first-order IQ imbalance terms, and any second-order term will be much smaller and exist only when both the transmitter and receiver have IQ imbalances.

Figure 4:
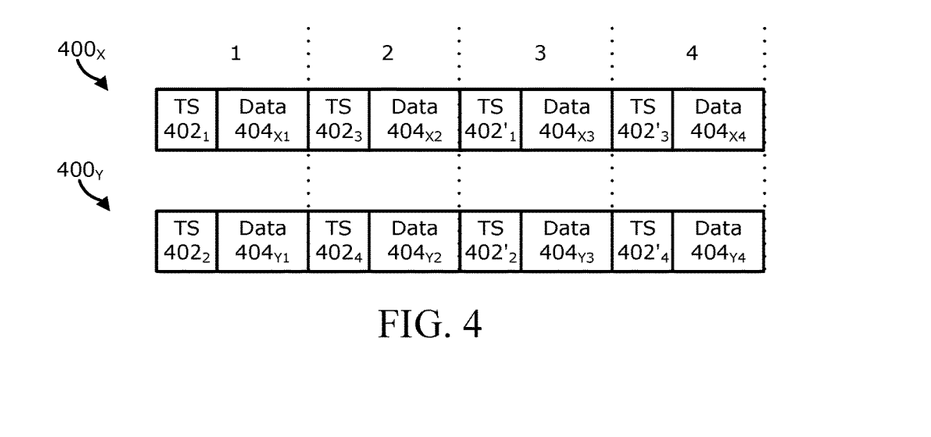
FIG. 4 is a data stream including training sequences of the present disclosure.

In an embodiment according to the present disclosure, a transmitter creates data stream for use, for example, by a PM-QAM in an optical data transmission system. The transmitter itself could be identical to what is shown in FIG. 1 except that DSP 104 has been programmed to insert additional training sequences into the data stream. In FIG. 4, which shows an example of four frames of such a data stream, X-polarization data stream $400_X$ includes data segments $404_{X1}$ through $404_{X4}$ and Y-polarization data stream $400_Y$ includes data segments $404_{Y1}$ through data $404_{Y4}$. A first group of training sequences $402_1$, $402_2$, $402_3$, and $402_4$ (collectively $402_n$), which are known in conventional systems, are interspersed in X-polarization data stream $400_X$ and Y-polarization data stream $400_Y$. A second group of training sequences $402'_1$, $402'_2$, $402'_3$, and $402'_4$ (collectively $402'_n$), which are previously unknown in conventional systems, are also interspersed in X-polarization data stream $400_X$ and Y-polarization data stream $400_Y$. Training sequences $402'_n$ are derived from training sequences $402_n$ by rotating training sequences $402_n$ by 90° in IQ space. For example, the second group of training sequences could be derived as follows:

$$S'_1(f) = S_1(f) \times e^{j\frac{\pi}{2}} = jS_1(f) \quad \text{(eq. 13)}$$

$$S'_2(f) = S_2(f) \times e^{j\frac{\pi}{2}} = jS_2(f) \quad \text{(eq. 14)}$$

$$S'_3(f) = S_3(f) \times e^{j\frac{\pi}{2}} = jS_3(f) \quad \text{(eq. 15)}$$

$$S'_4(f) = S_4(f) \times e^{j\frac{\pi}{2}} = jS_4(f) \quad \text{(eq. 16)}$$

where $S_1(f)$ is the Fourier transform of the first conventional training sequence (TS $402_1$), $S_2(f)$ is the Fourier transform of the second conventional training sequence (TS $402_2$), and so on, $S'_1(f)$ is the Fourier transform of the first derived training sequence (TS $402'_1$), $S'_2(f)$ is the Fourier transform of the second derived training sequence (TS $402'_2$), and so on, e is Euler's number, and j is the square root of −1.

Figure 5:
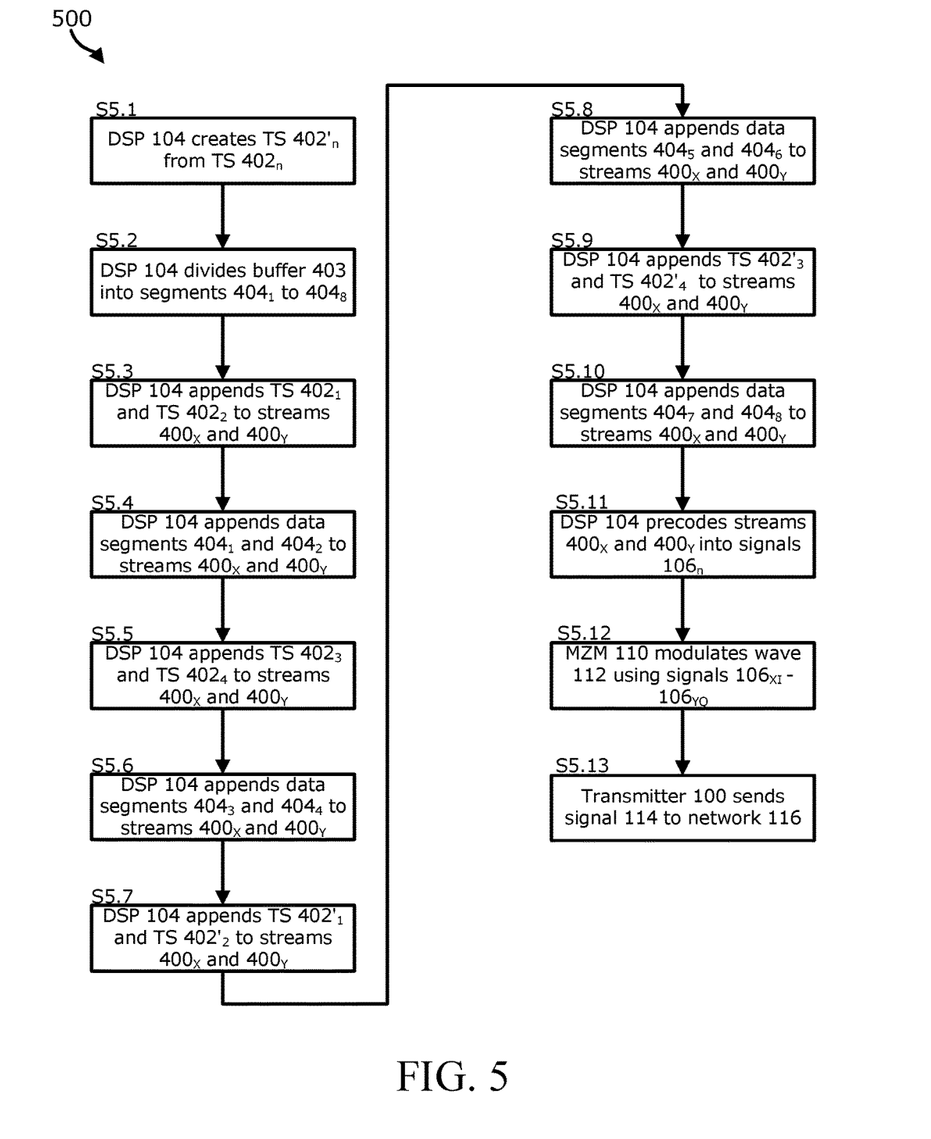
FIG. 5 is a flow chart for creating a data stream including training sequences of the present disclosure.

FIG. 5 shows an exemplary flowchart 500 for creation of four consecutive frames of a dual-polarization data stream, such as that shown in FIG. 4 as data streams $400_X$ and $400_Y$, by a digital signal processor, such as that shown in FIG. 1 as DSP 104, and transmission through a PM-QAM modulator, such as that shown in FIG. 1 as MZM 110.

In step S5.1, DSP 104 programmatically derives a second group of training sequences $402'_1$, $402'_2$, $402'_3$, and $402'_4$ from a first group of training sequences $402_1$, $402_2$, $402_3$, and $402_4$ according to equations eq. 13 through eq. 16.

In Step S5.2, DSP 104 divides input buffer 403 into eight data segments $404_1$ through $404_8$.

In Step S5.3, DSP 104 appends training sequences $402_1$ and $402_2$ onto data streams $400_X$ and $400_Y$. In Step S5.4, DSP 104 appends data $404_1$ and $404_2$ onto data streams $400_X$ and $400_Y$. Similarly, in Steps S5.5 through S5.10, DSP 104 continues appending training sequences and data segments in a like manner until all of the training sequences and data segments have been added onto data streams $400_X$ and $400_Y$, creating four consecutive frames of data in data streams $400_X$ and $400_Y$.

In Step S5.11, DSP 104 precodes data streams $400_X$ and $400_Y$ into high-speed data signals $106_{XI}$, $106_{XQ}$, $106_{YI}$, and $106_{YQ}$.

In Step S12, MZM 110 uses high-speed data signals $106_{XI}$, $106_{XQ}$, $106_{YI}$, and $106_{YQ}$ to modulate carrier wave 112 emitted by laser diode 108 to produce modulated optical signal 114.

In step S5.13, transmitter 100 sends optical signal 114 to optical network 116.

As one of ordinary skill in the art will recognize, the foregoing steps are readily adaptable to a number of variations without departing from the spirit of the embodiment.

By way of example and not limitation, DSP 104 could be a dedicated digital signal processor, it could be a general purpose processor programmed to perform digital signal processing functions, or it could be an application specific integrated circuit designed to perform digital signal processing functions. Further, DSP 104 could be a single device or it could be a group of similar devices operating in parallel.

By way of example and not limitation, input buffer 403 could contain (and in practice would contain) more than four frames of data, in which case DSP 104 may repeat steps S5.2 through S5.10 as long as there was unprocessed data in input buffer 403. Further, steps S5.2 through S5.10 could be implemented as a loop or any other suitable programming control construct. Further, DSP 104 could divide and disperse input buffer 403 into data streams $400_X$ and $400_Y$ in any order, and input buffer 403 could be implemented as multiple buffers each having data that is related or unrelated to the data in other buffers. Further, DSP 104 could be programmed to perform other processing on the data from input buffer 403 before, during, or after copying it to data streams $400_X$ and $400_Y$, such as encrypting the data, compressing the data, or adding error correcting codes to the data.

By way of example and not limitation, rather than using DSP 104 to create the derived group of training sequences in Step S5.1, the derived group of training sequences could be pre-programmed and stored in memory as part of the manufacturing or installation process, or they could be downloaded into DSP 104's memory by a maintenance or administration program. Further, rather than having four conventional training sequences ($402_1$-$402_4$) and four derived training sequence ($402'_1$-$402'_4$), there could be any number of conventional and derived training sequence pairs in a single frame. Further, successive frames in data streams $400_X$ and $400_Y$ could cycle through multiple sets of conventional and derived training sequences.

By way of example and not limitation, the flowchart 500 could be adapted for use with a single polarization modulator. Conceptually this would be similar to constructing only X-polarization data stream $400_X$, although it may be useful to first determine the most efficacious number of conventional and derived training sequences, as would be readily obtainable by one of ordinary skill.

By way of example and not limitation, steps S5.11 through S5.13 could include the use of RF drivers, amplifiers, and other components known by of ordinary skill to be useful in imposing data signals onto a carrier wave.

By way of example and not limitation, while steps S5.11 through S5.13 could be accomplished using conventional precoding and modulation techniques, additional and/or alternative hardware could be used for precoding and modulating data streams $400_X$ and $400_Y$ into modulated optical signal 114.

Other examples of changes, substitutions, omissions, and alterations to flowchart 500 are ascertainable by one skilled in the art and may be made without departing from the spirit and scope of the present disclosure.

In an embodiment according to the present disclosure, a receiver converts a received modulated optical signal and interprets additional training sequences found in the data stream as derived training sequences. The receiver could be identical to what is shown in FIG. 1 except that DSP 124 has been programmed to interpret additional training sequences found in the data stream as derived training sequences.

Figure 6:
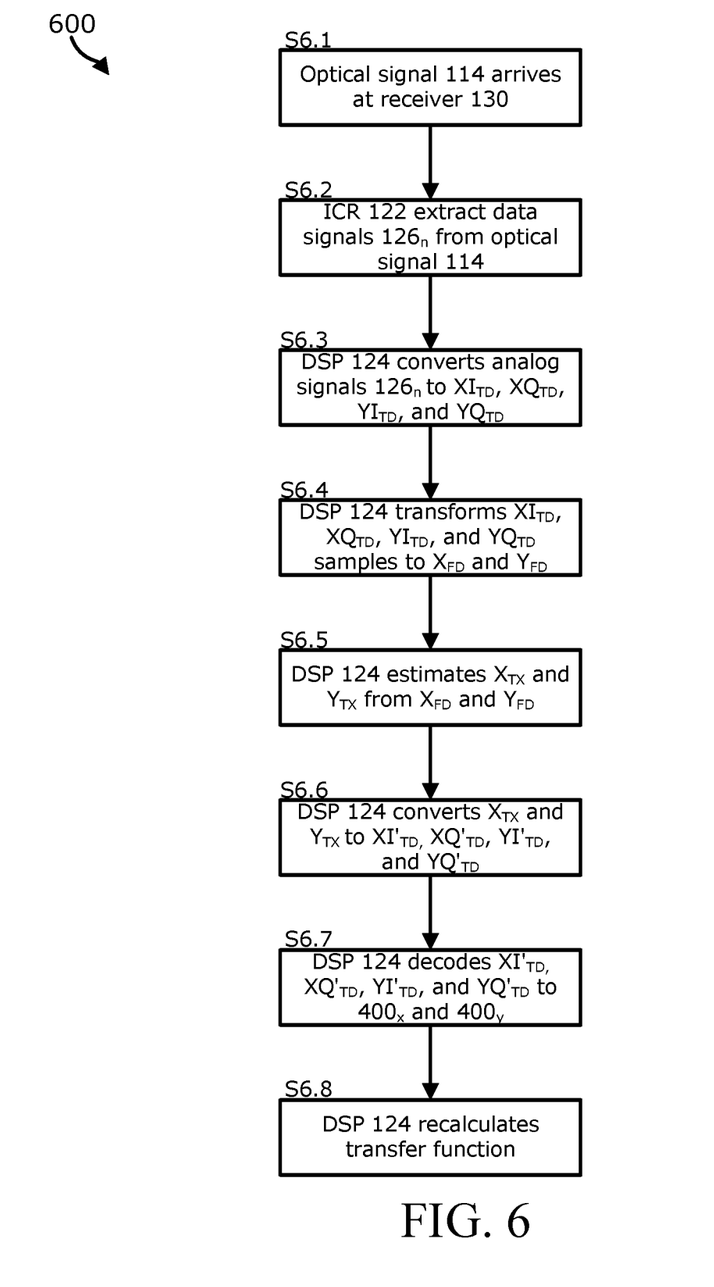
FIG. 6 is a flow chart for interpretation of a data stream including training sequences of the present disclosure.

FIG. 6 shows an exemplary flowchart 600 for receiving a modulated optical signal, such as optical signal 114 as output by MZM 110 in step S5.13 of FIG. 5, and interpreting the optical signal as a dual-polarization data stream, such as data streams $400_X$ and $400_Y$ as shown in FIG. 4.

In step S6.1, modulated optical signal 114 arrives at receiver 130. The quality of optical signal 114, in virtually all cases, may have degraded from an ideal signal because of imperfections in the transmitter as well as imperfections in the transmission media of network 116.

In step S6.2, integrated coherent receiver (ICR) 122 uses local oscillator 128 to extract analog data signals $126_{XI}$, $126_{XQ}$, $126_{YI}$, and $126_{YQ}$ from modulated optical signal 114. Imperfections in ICR 122 may further degrade the accuracy of $126_{XI}$, $126_{XQ}$, $126_{YI}$, and $126_{YQ}$.

In step S6.3, DSP 124 converts analog data signals $126_{XI}$, $126_{XQ}$, $126_{YI}$, and $126_{YQ}$ into digitized samples $XI_{TD}$, $XQ_{TD}$, $YI_{TD}$, and $YQ_{TD}$ which are representative of the received data streams in the time domain. Imperfections in the analog-to-digital circuitry may further degrade the accuracy of $XI_{TD}$, $XQ_{TD}$, $YI_{TD}$, and $YQ_{TD}$.

In step S6.4, DSP 124 transforms $XI_{TD}$, $XQ_{TD}$, $YI_{TD}$, and $YQ_{TD}$ from the time domain to the frequency domain using a fast Fourier transform as follows:

$$X_{FD}(f) = FFT(XI_{TD} + j*XQ_{TD}) \quad \text{(eq. 17)}$$

$$Y_{FD}(f) = FFT(YI_{TD} + j*YQ_{TD}) \quad \text{(eq. 18)}$$

where $X_{FD}(f)$ and $Y_{FD}(f)$ are the frequency domain representations of the X-polarization and Y-polarization data streams, FFT is a fast Fourier transform function as would be known to one of ordinary skill, $XI_{TD}$, $XQ_{TD}$, $YI_{TD}$, and $YQ_{TD}$ are the digitized received data stream, and j is the square root of −1.

In step S6.5, DSP 124 estimates data streams from frequency domain representations of the X-polarization and Y-polarization data streams by applying a transfer function as follows:

$$\begin{bmatrix} X'_{FD}(f) \\ Y'_{FD}(f) \end{bmatrix} = \begin{bmatrix} T_{XX}(f) & T_{XY}(f) \\ T_{YX}(f) & T_{YY}(f) \end{bmatrix}^{-1} \begin{bmatrix} X_{FD}(f) \\ Y_{FD}(f) \end{bmatrix} \quad \text{(eq. 19)}$$

where $X'_{FD}(f)$ and $Y'_{FD}(f)$ are the estimated X-polarization and Y-polarization data streams in the frequency domain, $X_{FD}(f)$ and $Y_{FD}(f)$ are the frequency domain representations of the X-polarization and Y-polarization received data streams, and $T_{XX}(f)$, $T_{XY}(f)$, $T_{YX}(f)$, and $T_{YY}(f)$ are elements of the transfer function in the form of a 2×2 matrix, where the [ ]$^{-1}$ indicates an inverse transfer function.

The transfer function is created from the difference between the training sequences that were sent by the transmitter and the training sequences that were received by the receiver, and is adjusted over the course of processing a sequence of frames, as shown in step S6.8. Thus, when processing the first two frames, DSP 124 will not have any previous frames from which to extract training sequences, and as such, after application of the transfer function, $X'_{FD}(f)$ and $Y'_{FD}(f)$ will be the same as $X_{FD}(f)$ and $Y_{FD}(f)$. However, as seen in step S6.8, DSP 124 refines the transfer function according to the newly-received training sequences. As such, application of the transfer function to $X_{FD}(f)$ and $Y_{FD}(f)$ will become more and more accurate over successive frames, resulting in better and better estimates for $X'_{FD}(f)$ and $Y'_{FD}(f)$.

In step S6.6, DSP 124 transforms the estimated X-polarization and Y-polarization data streams in the frequency domain back to the time domain using an inverse fast Fourier transform as follows:

$$XI'_{TD} = \text{real}(IFFT(X'_{FD}(f))) \quad \text{(eq. 20)}$$

$$XQ'_{TD} = \text{imag}(IFFT(X'_{FD}(f))) \quad \text{(eq. 21)}$$

$$YI'_{TD} = \text{real}(IFFT(Y'_{FD}(f))) \quad \text{(eq. 22)}$$

$$YQ'_{TD} = \text{imag}(IFFT(Y'_{FD}(f))) \quad \text{(eq. 23)}$$

where $XI'_{TD}$, $XQ'_{TD}$, $YI'_{TD}$, and $YQ'_{TD}$ are the I and Q components of the X-polarization and Y-polarization data streams in the time domain as estimated by the transform function $T_{AVE}$, IFFF is an inverse fast Fourier transform as would be known to one of ordinary skill, real is a function for extract the real component of a complex number, imag is a function for extracting the imaginary component of a complex number, and $X'_{FD}(f)$ and $Y'_{FD}(f)$ are the estimated X-polarization and Y-polarization data streams in the frequency domain.

In step S6.7, DSP 124 decodes $XI'_{TD}$, $XQ'_{TD}$, $YI'_{TD}$, and $YQ'_{TD}$ into data streams $400_X$ and $400_Y$ according to the modulation scheme used by the transmitter.

In step S6.8, DSP 124 adjusts the transfer function by first calculating a transfer function $T_{CURR}$ according to the received training sequences ($RTS_n$) and the transmitted (expected) training sequences ($TTS_n$) in the current two frames as follows:

$$T_{CURR}(f) = \begin{bmatrix} RTS_1(f) & RTS_3(f) \\ RTS_2(f) & RTS_4(f) \end{bmatrix} \begin{bmatrix} TTS_1(f) & TTS_3(f) \\ TTS_2(f) & TTS_4(f) \end{bmatrix}^{-1} \quad \text{(eq. 24)}$$

and then recalculating the transfer function as follows:

$$T_{NEW}(f) = \alpha T_{PREV}(f) + (1-\alpha) T_{CURR}(f) \quad \text{(eq. 25)}$$

where $T_{NEW}$ is the recalculated value for the transfer function, $T_{PREV}$ is the previous value of the transfer function, and a is a forgetting factor with a typical value of 0.8~0.9.

As one of ordinary skill in the art will recognize, the foregoing steps are readily adaptable to a number of variations without departing from the spirit of the embodiment.

By way of example and not limitation, flowchart 600 could be (and in practice would be) applied to a plurality of sets of successive frames, thus steps S6.1 through S6.8 would be repeated indefinitely. Further, in some embodiments, a number of frames could be used to establish frame boundaries and the location of the training sequences within individual frames. Further, in some embodiments, processing steps may be programmed to operate in parallel, they could be programmed to repeat one step before moving to the next step, they may programmed to store sequential frames together in a single buffer, or they could use any other programming technique that would be known to one of ordinary skill for programming receivers for efficient operation.

By way of example and not limitation, DSP 124 could be a dedicated digital signal processor, it could be a general purpose processor programmed to perform digital signal processing functions, or it could be an application specific integrated circuit designed to perform digital signal processing functions. Further, DSP 124 could be a single device or it could be a group of similar devices operating in parallel.

By way of example and not limitation, there are a number of designs for ICRs that would be known to one of ordinary skill, and step S6.1 does not require the use of any specific design, so long as it is capable of extracting data signals $126_{XI}$, $126_{XQ}$, $126_{YI}$, and $126_{YQ}$ from modulated optical signal 114.

By way of example and not limitation, the conversion of analog signals to digital data in S6.3 could be performed by analog-to-digital converters (ADCs) that are built into DSP 124, or alternative, the ADCs could be separate devices.

By way of example and not limitation, the training sequences could be pre-programmed and stored in DSP 124's memory as part of the manufacturing or installation process, they could be downloaded into DSP 124's memory by a maintenance or administration program, or they could be agreed upon in advance by using out-of-band signaling. Further, rather than having four conventional training sequences ($402_1$-$402_4$) and four derived training sequence ($402'_1$-$402'_4$), the transmitter and receiver could agree to use any number of conventional and derived training sequence pairs. Further, the transmitter and receiver could agree to cycle through multiple sets of conventional and derived training sequences.

By way of example and not limitation, flowchart 600 could be adapted for use with a single polarization modulator. Conceptually this would be similar to interpreting just the X-polarization data stream $400_X$, although it would be useful to first determine the most efficacious number of conventional and derived training sequences, as would be readily obtainable by one of ordinary skill.

Other examples of changes, substitutions, omissions, and alterations to flowchart 600 are ascertainable by one skilled in the art and may be made without departing from the spirit and scope of the present disclosure.

Figure 7:
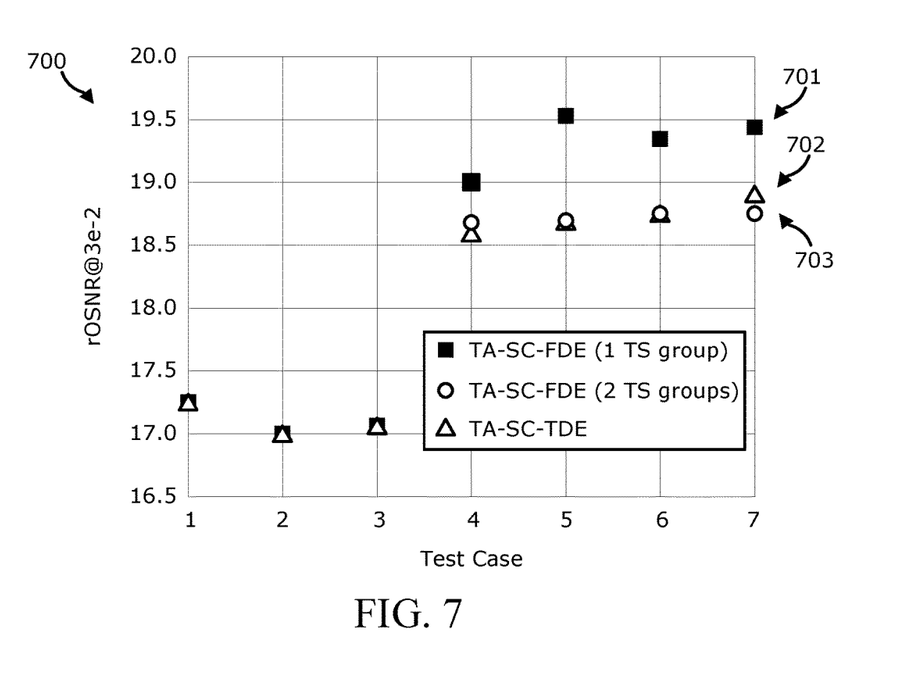
FIG. 7 is a chart comparing performance of TA-SC-FDE systems utilizing training sequences of the present disclosure with conventional TA-SC-TDE systems.

Chart 700 in FIG. 7 compares the required optical signal to noise ratio (rOSNR) for seven test simulations for a 34.4 GHz 16 QAM optical modulated signal using conventional TA-SC-FDE systems using conventional training sequences (shown as squares 701), TA-SC-TDE systems (shown as triangles 702), and TA-SC-FDE systems using the derived training sequences of the present disclosure (shown as circles 703). As can be seen, for worst-case test cases 4-7, the TA-SC-FDE system using the derived training sequences performs about the same as the TA-SC-TDE system.

Disclosed herein is a method for a digital signal processor (DSP) to create a data stream for transmission over fiber optic media comprising a means for receiving a plurality of data segments, a means for writing a first frame to a first buffer, wherein the first frame comprises a first training sequence and a first data segment of the plurality of data segments, a means for writing a second frame to the first buffer, wherein the second frame comprises a second training sequence and a second data segment of the plurality of data segments, a means for writing a third frame to the first buffer, wherein the third frame comprises a third training sequence and a third data segment of the plurality of data segments, and a means for writing a fourth frame to the first buffer, wherein the fourth frame comprises a fourth training sequence and a fourth data segment of the plurality of data segments, wherein the first training sequence and the second training sequences are mathematically related to the third training sequence and the fourth training sequence.

Further disclosed herein is a method for a receiver to interpret a dual-polarization optical signal comprising a means for receiving the optical signal, wherein the optical signal comprises four frames of an X-polarization data stream and four frames of a Y-polarization data stream, wherein each frame comprises a unique training sequence, wherein the training sequence of the first frame of the X-polarization data stream is mathematically-related to the training sequence of the third frame of the X-polarization data stream, wherein the training sequence of the second frame of the X-polarization data stream is mathematically-related to the training sequence of the fourth frame of the X-polarization data stream, wherein the training sequence of the first frame of the Y-polarization data stream is mathematically-related to the training sequence of the third frame of the Y-polarization data stream, and wherein the training sequence of the second frame of the Y-polarization data stream is mathematically-related to the training sequence of the fourth frame of the Y-polarization data stream, a means for estimating the first and second frames of the X-polarization data stream and the first and second frames of the Y-polarization data stream according to a first transfer function, a means for calculating a second transfer function according to the first transfer function, the training sequence of the first and second frames of the X-polarization data stream, and the training sequences of the first and second frames of the Y-polarization data stream, a means for estimating the third and fourth frames of the X-polarization data stream and the third and fourth frames of the Y-polarization data stream according to the second transfer function, and a means for calculating a third transfer function according to the second transfer function, the training sequence of the third and fourth frames of the X-polarization data stream, and the training sequences of the third and fourth frames of the Y-polarization data stream.

Further disclosed herein is a transceiver for sending and receiving data streams over fiber optic media, the transceiver comprising a means for transmitting a data stream and a means for receiving a data stream. The means for transmitting the data stream further comprises a means for inserting a plurality of training sequences into a first X-polarization data stream, wherein a first training sequence of the first X-polarization data stream is mathematically-related to a second training sequence of the first X-polarization data stream, a means for inserting a plurality of training sequences into a first Y-polarization data stream, wherein a first training sequence of the first Y-polarization data stream is mathematically-related to a second training sequence of the first Y-polarization data stream, and a means for precoding the first X-polarization data stream and the first Y-polarization data stream into a first plurality of high-speed data signals for modulation by the dual-polarity optical modulator. The means for receiving the data stream comprises a means for receiving a dual-polarity optical signal from the ICR, wherein the signal comprise four frames of a second X-polarization data stream and four frames of a second Y-polarization data stream, wherein each frame comprises a unique training sequence, wherein a first training sequence of the second X-polarization data stream is mathematically-related to a second training sequence of the second X-polarization data stream, and wherein a first training sequence of the second Y-polarization data stream is mathematically-related to a second training sequence of the second Y-polarization data stream, a means for estimating the first and second frames of the X-polarization data stream and the first and second frames of the Y-polarization data stream according to a first transfer function, and a means for calculating a second transfer function according to the first transfer function, the training sequences of the first and second frames of the X-polarization data stream, and the training sequences of the first and second frames of the Y-polarization data stream.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein.

What is claimed is:

1. A method for a digital signal processor (DSP) to create a data stream for transmission over fiber optic media, the method comprising:
    receiving a plurality of data segments;
    writing a first frame to a first buffer, wherein the first frame comprises a first training sequence and a first data segment of the plurality of data segments,
    writing a second frame to the first buffer, wherein the second frame comprises a second training sequence and a second data segment of the plurality of data segments;
    writing a third frame to the first buffer, wherein the third frame comprises a third training sequence and a third data segment of the plurality of data segments; and
    writing a fourth frame to the first buffer, wherein the fourth frame comprises a fourth training sequence and a fourth data segment of the plurality of data segments,
    wherein the first training sequence and the second training sequences are mathematically-related to the third training sequence and the fourth training sequence,
wherein the third training sequence and the fourth training sequence are derived from the first training sequence and the second training sequence according to the relationships:

$$S_3(f) = S_1(f) \times e^{j\frac{\pi}{2}} = jS_1(f) \text{ and}$$
$$S_4(f) = S_2(f) \times e^{j\frac{\pi}{2}} = jS_2(f),$$

wherein $S_1(f)$ is the Fourier transform of the first training sequence, wherein $S_2(f)$ is the Fourier transform of the second training sequence, wherein $S_3(f)$ is the Fourier transform of the third training sequence, wherein $S_4(f)$ is the Fourier transform of the fourth training sequence, wherein e is Euler's number, and wherein j is the square root of −1.

2. The method of claim 1, wherein the third training sequence is derived from the first training sequence by rotating the first training sequence by ninety degrees, and wherein the fourth training sequence is derived from the second training sequence by rotating the second training sequence by ninety degrees.

3. The method of claim 1 further comprising:
    writing a first frame to a second buffer, wherein the first frame comprises a fifth training sequence and a fifth data segment of the plurality of data segments;
    writing a second frame to the second buffer, wherein the second frame comprises a sixth training sequence and a sixth data segment of the plurality of data segments;
    writing a third frame to the second buffer, wherein the third frame comprises a seventh training sequence and a seventh data segment of the plurality of data segments; and
    writing a fourth frame to the second buffer, wherein the fourth frame comprises an eighth training sequence and an eighth data segment of the plurality of data segments,
    wherein the seventh training sequence and the eighth training sequence are mathematically-related to the fifth training sequence and the sixth training sequence.

4. The method of claim 3, wherein the seventh training sequence is derived from the fifth training sequence by rotating the fifth training sequence by ninety degrees, and wherein the eighth training sequence is derived from the sixth training sequence by rotating the sixth training sequence by ninety degrees.

5. The method of claim 3, wherein the seventh training sequence and the eighth training sequence are derived from the fifth training sequence and the sixth training sequence according to the relationships:

$$S_7(f) = S_5(f) \times e^{j\frac{\pi}{2}} = jS_5(f) \text{ and}$$
$$S_8(f) = S_6(f) \times e^{j\frac{\pi}{2}} = jS_6(f),$$

wherein $S_5(f)$ is the Fourier transform of the fifth training sequence, wherein $S_6(f)$ is the Fourier transform of the sixth training sequence, wherein $S_7(f)$ is the Fourier transform of the seventh training sequence, wherein $S_8(f)$ is the Fourier transform of the eighth training sequence, wherein e is Euler's number, and wherein j is the square root of −1.

6. The method of claim 3, wherein the data stream comprises an X-polarization data stream portion and a Y-polarization data stream portion, wherein the first buffer corresponds to an X-polarization data stream portion, and wherein the second buffer corresponds to a Y-polarization data stream portion.

7. The method of claim 1 further comprising:
    precoding the first buffer into an in-phase high-speed data signal and a quadrature high-speed data signal; and
    sending the in-phase high-speed data signal and the quadrature high-speed data signal to a modulator.

8. The method of claim 6 further comprising:
    precoding the X-polarization data stream portion into a first in-phase high-speed data signal and a first quadrature high-speed data signal;
    precoding the Y-polarization data stream portion into a second first in-phase high-speed data signal and a second quadrature high-speed data signal; and
    sending the first in-phase high-speed data signal, the first quadrature high-speed data signal, the second in-phase high-speed data signal, and the second quadrature high-speed data signal to a dual-polarization modulator.

9. A method for a receiver to interpret a dual-polarization optical signal, the method comprising:
    receiving the optical signal, wherein the optical signal comprises four frames of an X-polarization data stream and four frames of a Y-polarization data stream, wherein each frame comprises a unique training sequence, wherein the training sequence of the first frame of the X-polarization data stream is mathematically-related to the training sequence of the third frame of the X-polarization data stream, wherein the training sequence of the second frame of the X-polarization data stream is mathematically-related to the training sequence of the fourth frame of the X-polarization data stream, wherein the training sequence of the first frame of the Y-polarization data stream is mathematically-related to the training sequence of the third frame of the Y-polarization data stream, and wherein the training sequence of the second frame of the Y-polarization data stream is mathematically-related to the training sequence of the fourth frame of the Y-polarization data stream;

estimating the first and second frames of the X-polarization data stream and the first and second frames of the Y-polarization data stream according to a first transfer function;

calculating a second transfer function according to the first transfer function, the training sequence of the first and second frames of the X-polarization data stream, and the training sequences of the first and second frames of the Y-polarization data stream;

estimating the third and fourth frames of the X-polarization data stream and the third and fourth frames of the Y-polarization data stream according to the second transfer function; and calculating a third transfer function according to the second transfer function, the training sequences of the third and fourth frames of the X-polarization data stream, and the training sequences of the third and fourth frames of the Y-polarization data stream, wherein the mathematical relationship between the training sequences is:

$$X_3(f) = X_1(f) \times e^{j\frac{\pi}{2}} = jX_1(f),$$
$$X_4(f) = X_2(f) \times e^{j\frac{\pi}{2}} = jX_2(f),$$
$$Y_3(f) = Y_1(f) \times e^{j\frac{\pi}{2}} = jY_1(f), \text{ and}$$
$$Y_4(f) = Y_2(f) \times e^{j\frac{\pi}{2}} = jY_2(f),$$

wherein $X_n(f)$ is the training sequence of the $n^{th}$ frame of the X-polarization data stream, wherein $Y_n(f)$ is the training sequence of the $n^{th}$ frame of the Y-polarization data stream, wherein e is Euler's number, and wherein j is the square root of −1.

10. The method of claim 9, wherein the training sequence of the third frame of the X-polarization data stream is rotated by ninety degrees with respect to the training sequence of the first frame of the X-polarization data stream, wherein the training sequence of the fourth frame of the X-polarization data stream is rotated by ninety degrees with respect to the training sequence of the second frame of the X-polarization data stream, wherein the training sequence of the third frame of the Y-polarization data stream is rotated by ninety degrees with respect to the training sequence of the first frame of the Y-polarization data stream, and wherein the training sequence of the fourth frame of the Y-polarization data stream is rotated by ninety degrees with respect to the training sequence of the second frame of the Y-polarization data stream.

11. The method of claim 9, wherein the second transfer function is calculated according to the relationship:

$$T_2(f) = \alpha T_1(f) + (1-\alpha)\begin{bmatrix} RX_1(f) & RX_2(f) \\ RY_1(f) & RY_2(f) \end{bmatrix}\begin{bmatrix} TX_1(f) & TX_2(f) \\ TY_1(f) & TY_2(f) \end{bmatrix}^{-1}$$

wherein $T_2(f)$ is the second transfer function, $T_1(f)$ is the first transfer function, wherein $RX_1(f)$ and $RX_2(f)$ are the received training sequences from the first and second frames of the X-polarization data stream, wherein $RY_1(f)$ and $RY_2(f)$ are the received training sequences from the first and second frames of the Y-polarization data stream, wherein $TX_1(f)$ and $TX_2(f)$ are the transmitted training sequences from the first and second frames of the X-polarization data stream, wherein $TY_1(f)$ and $TY_2(f)$ are the transmitted training sequences from the first and second frames of the Y-polarization data stream, and wherein α is a forgetting factor between 0.8 and 0.9.

12. The method of claim 9, wherein the third transfer function is calculated according to the relationship:

$$T_3(f) = \alpha T_2(f) + (1-\alpha)\begin{bmatrix} RX_3(f) & RX_4(f) \\ RY_3(f) & RY_4(f) \end{bmatrix}\begin{bmatrix} TX_3(f) & TX_4(f) \\ TY_3(f) & TY_4(f) \end{bmatrix}^{-1}$$

wherein $T_3(f)$ is the third transfer function, $T_2(f)$ is the second transfer function, wherein $RX_3(f)$ and $RX_4(f)$ are the received training sequences from the third and fourth frames of the X-polarization data stream, wherein $RY_3(f)$ and $RY_4(f)$ are the received training sequences from the third and fourth frames of the Y-polarization data stream, wherein $TX_3(f)$ and $TX_4(f)$ are the transmitted training sequences from the third and fourth frames of the X-polarization data stream, wherein $TY_3(f)$ and $TY_4(f)$ are the transmitted training sequences from the third and fourth frames of the Y-polarization data stream, and wherein a is a forgetting factor between 0.8 and 0.9.

13. The method of claim 9, wherein estimating the first and second frames of the X-polarization data stream and the first and second frames of the Y-polarization data stream comprises:

transforming the optical signal from an analog representation to a first time-domain digital representation;

transforming the first time-domain digital representation to a first frequency-domain digital representation;

creating a second frequency-domain digital representation from the first frequency-domain digital representation according to the first transfer function;

transforming the second frequency-domain digital representation to a second time-domain digital representation; and decoding the second time-domain digital representation according to a modulation scheme.

14. The method of claim 13, wherein creating a second frequency-domain digital representation comprises applying the first transfer function to the first frequency-domain digital representation according to the relationship:

$$\begin{bmatrix} X_2(f) \\ Y_2(f) \end{bmatrix} = \begin{bmatrix} T_{XX}(f) & T_{XY}(f) \\ T_{YX}(f) & T_{YY}(f) \end{bmatrix}^{-1} \begin{bmatrix} X_1(f) \\ Y_1(f) \end{bmatrix}$$

wherein $X_2(f)$ and $Y_2(f)$ are an X-polarization component and a Y-polarization component of the second frequency-domain digital representation, wherein $X_1(f)$ and $Y_1(f)$ are an X-polarization component and a Y-polarization component of the first frequency-domain digital representation, Txx(f), Txy(f), Tyx(f), and Tyy(f) are elements of the transfer function, and [ ]$^{-1}$ indicates an inverse of the transfer function.

15. A transceiver for sending and receiving data streams over fiber optic media, the transceiver comprising:
- a transmitter comprising a first digital signal processor (DSP) and a dual-polarity optical modulator; and
- a receiver comprising a second DSP and an integrated coherent receiver (ICR);
- wherein the first DSP is configured to:
  - insert a plurality of training sequences into a first X-polarization data stream, wherein a first training sequence of the first X-polarization data stream is mathematically-related to a second training sequence of the first X-polarization data stream;
  - insert a plurality of training sequences into a first Y-polarization data stream, wherein a first training sequence of the first Y-polarization data stream is mathematically-related to a second training sequence of the first Y-polarization data stream;
  - precode the first X-polarization data stream and the first Y-polarization data stream into a first plurality of high-speed data signals for modulation by the dual-polarity optical modulator, and
- wherein the second DSP is configured to:
  - receive an analog electrical signal from the ICR, wherein the signal comprise four frames of a second X-polarization data stream and four frames of a second Y-polarization data stream, wherein each frame comprises a unique training sequence, wherein a first training sequence of the second X-polarization data stream is mathematically-related to a second training sequence of the second X-polarization data stream, and wherein a first training sequence of the second Y-polarization data stream is mathematically-related to a second training sequence of the second Y-polarization data stream;
  - estimate the first and second frames of the X-polarization data stream and the first and second frames of the Y-polarization data stream according to a first transfer function; and
  - calculate a second transfer function according to the first transfer function, the training sequences of the first and second frames of the X-polarization data stream, and the training sequences of the first and second frames of the Y-polarization data stream,
- wherein the first training sequence of the first X-polarization data stream is mathematically-related to the second training sequence of the first X-polarization data stream according to the relationship:

$$X_2(f) = X_1(f) \times e^{j\frac{\pi}{2}} = jX_1(f),$$

and wherein the first training sequence of the first Y-polarization data stream is mathematically-related to the second training sequence of the first Y-polarization data stream according to the relationship:

$$Y_2(f) = Y_1(f) \times e^{j\frac{\pi}{2}} = jY_1(f).$$

16. The transceiver of claim 15, wherein a third training sequence of the first X-polarization data stream is mathematically-related to a fourth training sequence of the first X-polarization data stream, wherein a third training sequence of the first Y-polarization data stream is mathematically-related to a fourth training sequence of the first Y-polarization data stream, wherein a third training sequence of the second X-polarization data stream is mathematically-related to a fourth training sequence of the second X-polarization data stream, and wherein a third training sequence of the second Y-polarization data stream is mathematically-related to a fourth training sequence of the second Y-polarization data stream.

17. The transceiver of claim 15, wherein the first DSP and the second DSP are physically a single DSP.

* * * * *